US007782819B2

United States Patent
Ishikawa (10) Patent No.: US 7,782,819 B2
(45) Date of Patent: Aug. 24, 2010

(54) MOBILE COMMUNICATION SYSTEM, RADIO BASE STATION, OPERATION CONTROL METHOD AND PROGRAM THEREOF

(75) Inventor: Yasuaki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 761 days.

(21) Appl. No.: 11/745,025

(22) Filed: May 7, 2007

(65) Prior Publication Data

US 2007/0270143 A1 Nov. 22, 2007

(30) Foreign Application Priority Data

May 17, 2006 (JP) .............................. 2006-137148

(51) Int. Cl.
H04W 4/00 (2009.01)
(52) U.S. Cl. .................... 370/331; 370/329; 370/328; 370/338; 455/436; 455/442; 455/435.1
(58) Field of Classification Search ................ 370/331, 370/329, 328, 338; 455/436, 442, 435.1
See application file for complete search history.

(56) References Cited

U.S. PATENT DOCUMENTS

2005/0090260 A1* 4/2005 Semper ...................... 455/442

FOREIGN PATENT DOCUMENTS

| JP | 2004-135178 A | 4/2004 |
|---|---|---|
| JP | 2005-110014 A | 4/2005 |
| JP | 2006-115119 A | 4/2006 |

* cited by examiner

*Primary Examiner*—Nghi H Ly
(74) *Attorney, Agent, or Firm*—Sughrue Mion, PLLC

(57) ABSTRACT

To obtain a mobile communication system that can perform handover without causing instantaneous interruption and packet loss and without lowering the performance of the entire network when a mobile communication system is realized by the IP network. During handover of a MN from a handover source cell to a handover destination cell, the MN obtains a CoA of a link, to which a handover destination BTS is connected, and sends it to a handover source BTS. When the handover source BTS receives the CoA from the MN, it measures a data transfer time to the handover destination BTS and transfers an IP packet destined to the MN to the handover destination BTS, and after the transfer time has passed, the handover source BTS sends it to the MN as radio data. The handover destination BTS sends the transferred data to the MN as radio data. The MN sends a message including the CoA to a CN when the handover completed. When the CN receives the message, it routes and directly sends data to the handover destination BTS.

17 Claims, 5 Drawing Sheets

MOBILE COMMUNICATION SYSTEM, RADIO BASE STATION, OPERATION CONTROL METHOD AND PROGRAM THEREOF

BACKGROUND OF THE INVENTION

1. Field of the Invention

The present invention relates to a mobile communication system, a radio base station, an operation control method and a program thereof, and more specifically to a mobile communication system including the ALL-IP (Internet Protocol) network.

2. Related Art

As the mobile communication system has been widespread, loads on a communication common carrier such as increased frequency usage fee and cost of communication equipment have been controversial. On the other hand, as communication means have got more and more involved in the Information Technology, integration of the mobile communication network and the IP network has been drawing attention. The ALL-IP network has an effect of reducing the cost of equipment. Therefore, more and more businesses are thinking about using the ALL-IP network for their mobile communication network.

The CDMA (Code Division Multiple Access) mobile communication system used as a mainstream of the third generation mobile communication system or the OFDMA (Orthogonal Frequency Division Multiple Access) mobile communication system that is a candidate for the next generation mobile communication system has a feature of providing a stable quality without leading any instantaneous interruption by causing a mobile node to communicate with a plurality of base stations by soft handover when the mobile node moves between cells. As the IPv6 (Internet Protocol Version 6) is introduced, however, the number of IP addresses that can be allocated significantly increased. If a fixed IP address is allocated to a mobile node and the ALL-IP mobile communication network is realized in such circumstances, the IP technology for implementing soft handover between base stations each of which is present on a different IP network is needed. Good consideration on such IP technology has yet to be made.

For example, if a mobile communication system and an IP network are connected for realizing an IP communication between a mobile node (MN) and a correspondent node (CN) by using a fixed IP address with the fact that the MN is moving transparent to a user with a conventional art, the CN and the MN cannot be connected via a plurality of Base Transceiver Stations (BTSs), which may lead instantaneous interruption or packet loss during a hand over of the MN.

Further, the MN excessively issues a Binding update message at a boundary between cells. A large amount of transferred data is present between the IP networks, if a metric (an indicator representing the number of Hops or the bandwidth) from a Home Agent (HA) to a link to be transferred is so large. That may lower the performance of the entire network.

Such a conventional mobile communication system will be described in detail with reference to FIGS. 4 and 5.

Figure 4:
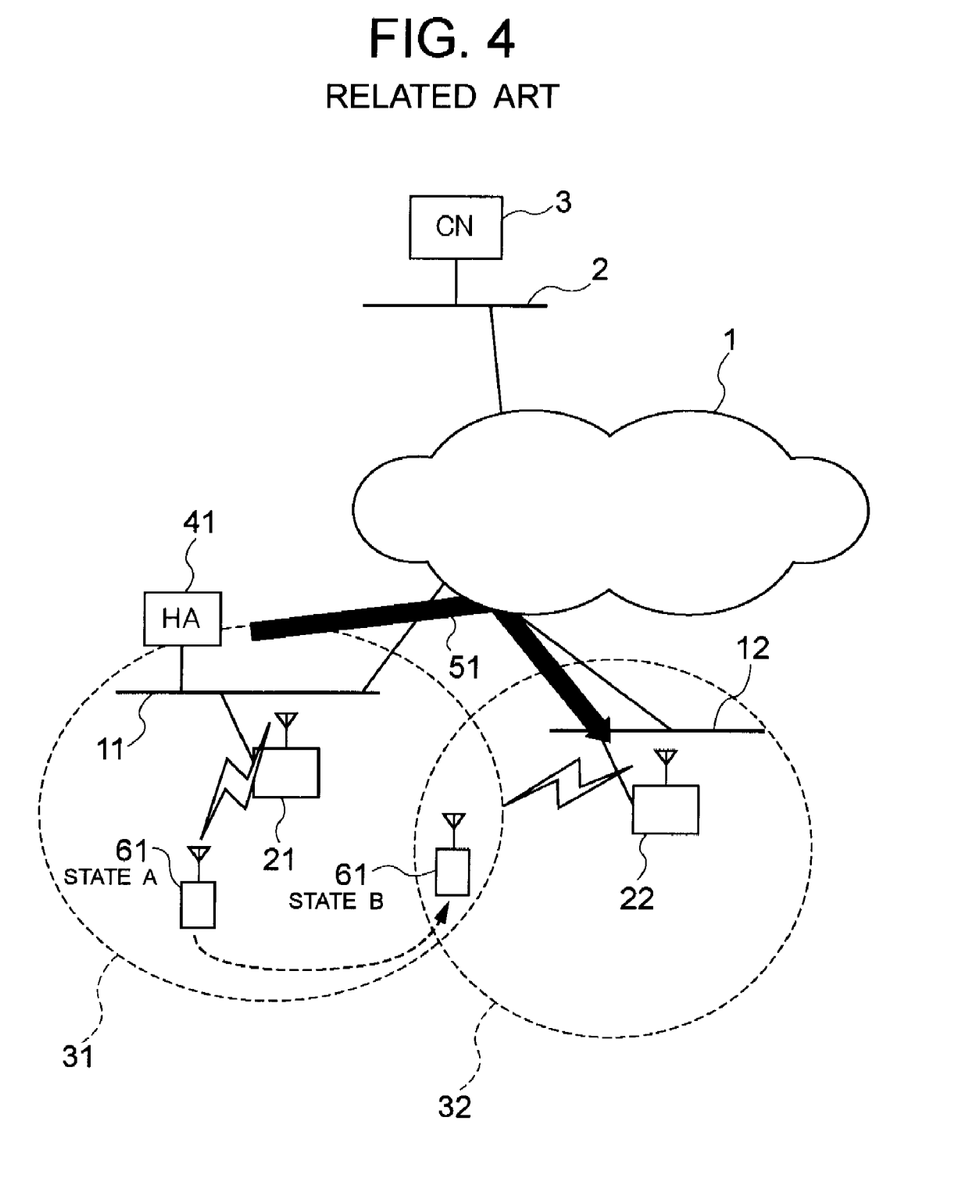
FIG. 4 is a diagram showing a configuration of a conventional mobile communication system.
Figure 5:
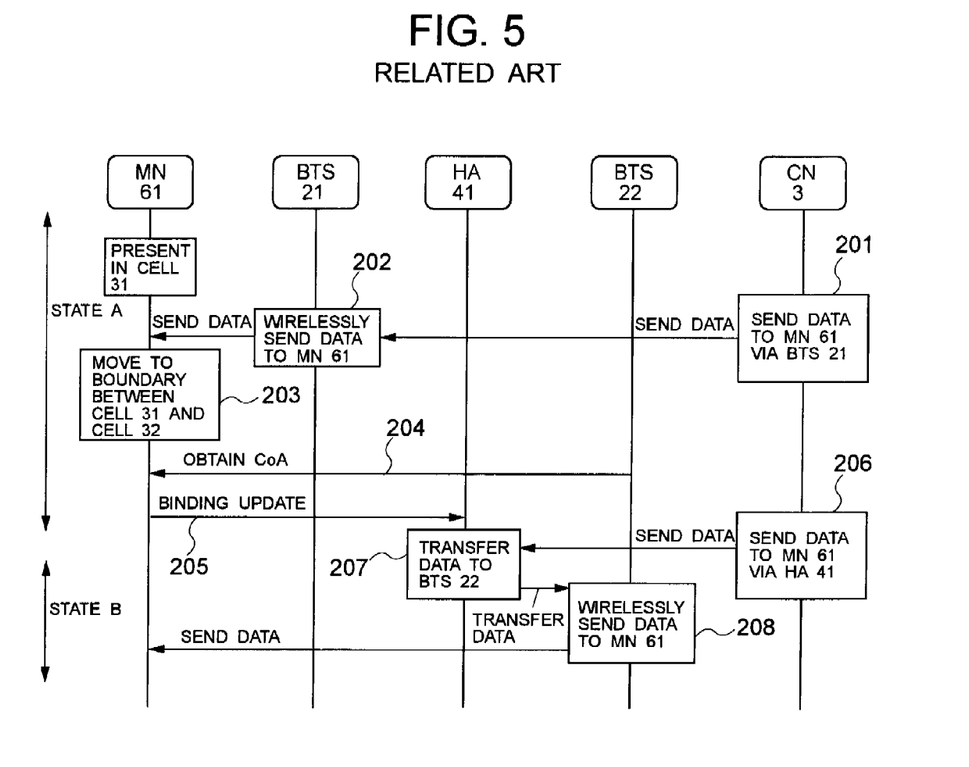
FIG. 5 is a sequence diagram showing operations of the mobile communication system of FIG. 4.

FIG. 4 is a diagram showing a configuration of a conventional mobile communication system. Referring to FIG. 4, a CN 3 is communicating with a MN 61. Here, the mobile communication system is connected with an IP network 1, the CN 3 is a correspondent node that is present on a link 2 connected with the IP network 1, and the MN 61 having a fixed IP address is present in a cell 31 that is formed by a BTS 21 present on a link 11. The communication between the CN 3 and the MN 61 is entirely performed by IP including the communication between the BTS 21 and the MN 61. As the MN 61 moves near to a cell 32, the MN 61 tries to perform handover to a BTS 22 in the cell 32.

After the handover, the MN 61 needs to communicate with the CN 3 via a link 12 to communicate with the BTS 22 that forms the cell 32, but the CN 3 does not recognize that the MN 61 has moved and still tries to communicate with the MN 61 via the link 11. Consequently, communication between the CN 3 and the MN 61 is disconnected.

The mobile IP that is optimized for the mobile communication environment causes the MN 61 to informing a Binding update message indicating that the MN 61 is to do handover to a HA 41 that is set on the link 11 so that, after the handover, the HA 41 transfers data sent from the CN 3 to the link 11 to the MN 61 that is present in the cell 32 of the BTS 22 that is connected to the link 12. In such a manner, the mobile IP can keep communication between the CN 3 and the MN 61 without recognizing the fact that the MN 61 has moved being transparent to the CN 3.

Next, a handover method in such a conventional mobile communication system will be described in detail with reference to FIGS. 4 and 5. FIG. 5 is a sequence diagram showing operations of the mobile communication system of FIG. 4. Referring to FIG. 5, the procedure for the MN 61 to do handover from the cell 31 to the cell 32 will be described.

(1) The MN 61 performs the IP communication with CN 3 over the BTS 21 in the handover source cell 31 (step 201). Then, the BTS 21 converts a received IP packet to radio data (step 202). (It is shown as a state A in FIGS. 4 and 5.)

(2) When the MN 61 moves to the boundary of the cell 32 (step 203), the handover to the cell 32 is implemented in the procedure shown below.

(3) The MN 61 obtains a Care of Address (CoA) which is address information of the link 12 in the cell 32 to which the MN 61 is to be connected, via the BTS 22 (step 204).

(4) The MN 61 sends the Binding update message including the obtained CoA to the HA 41 (step 205), and receives data from the cell 32.

(5) The HA 41 that receives the Binding update message from the MN 61 encapsulates the IP packet data destined to the MN 61 and transfers the data to the BTS 22 that is specified by the CoA included in the Binding update message via the IP network 1 (via a path 51) (step 207).

(6) The BTS 22 that receives the transferred data destined to the MN 61 from the HA 41 releases the encapsulation and sends the transferred data as radio data to the MN 61 (step 208). (It is shown as a state B in FIGS. 4 and 5)

As such, in the conventional mobile communication system, data is transferred from the HA 41 to the handover destination BTS 22 during the handover. Therefore, even when the MN 61 moves in the cell 31 or in the cell 32, the CN 3 can keep communication with the MN 61 without considering the current position of the MN 61. A conventional handover method, however, has problems below.

The first problem is in that a packet loss (loss of data) may occur when the MN 61 moves to another link. This is because that the CN 3 and the MN 61 cannot communicate with each other during a period since the MN 61 cannot receive data from the handover source BTS due to its movement to another link until the MN 61 detects a CoA of the link, and a period since the MN 61 tells the HA 41 that the MN 61 has moved and until the HA 41 starts transfer. To address the problem, a method in which the HA 41 transfers data to cells adjacent to the handover source cell 31 in advance (in FIG. 4, the cell 32) has been introduced (for example, see Japanese Patent Laid-Open No. 2004-135178). That has an effect of avoiding a packet loss, but radio data is also sent to unnecessary cells. Therefore, the method has a problem in that radio resources cannot be effectively used. If there are a plurality of adjacent cells, the amount of data to be transferred by the HA 41 increases. That may degrade the performance of the networks around.

In another addressing method that is also examined, the HA 41 buffers data from the CN 3 before the MN 61 does handover, and when the MN 61 completes the handover to the BTS 22 that forms the cell 32, the HA 41 starts transferring the data buffered therein to the MN 61 on the link 12. With the addressing method, no packet loss occurs during the handover, but instantaneous interruption occurs in communication with the CN 3 until the processing of the handover of the MN 61 ends. In addition, the HA 41 may try to collectively send a buffered large amount of data. Therefore, the large amount of data flows into the IP network 1, which may lower the performance of the entire network.

The second problem is in that if the MN 61 moves from the link 11 to a link with a larger metric, delay may occur during the data transfer from the HA 41 to the MN 61 or transfer of a large amount of data may lower the performance of the entire network.

In order to solve the problems, Japanese Patent Laid-Open No. 2006-115119 describes such that when the MN 61 performs handover, it sends to the handover source BTS 21 the Binding update message including address information of the link 12 that is connected with the handover destination BTS 22, so that the data is sent from the handover source BTS 21 to the MN 61, while the same data is transferred from the handover source BTS 21 to the handover destination BTS 22, so that the data is sent from the BTS 22 to the MN 61. Accordingly, the MN 61 receives data from both the handover source BTS 21 and the handover destination BTS 22, and enters in the soft handover state. Therefore, the MN 61 can perform the handover without causing instantaneous interruption of the communication or packet loss.

As mentioned above, the data is transferred from the handover source BTS 21 to the handover destination BTS 22 during the handover. The adjacent BTS can be arranged in a configuration with a small metric even on the IP network, however, even if data is transferred during the handover, the delay may be reduced. In addition, possibility that performance of the entire network is lowered can be eliminated.

Furthermore, Japanese Patent Laid-Open No. 2006-115119 discloses that CN 3 uses a path via the handover destination BTS 22 as a path of the IP packet that is sent to the MN 61 by sending the Binding update message from the MN 61 to the CN 3 when the handover completed.

As such, in the technique described in Japanese Patent Laid-Open No. 2006-115119, data is transferred from the handover source BTS 21 to the handover destination BTS 22. If a metric between the link 11 and the link 12 is large, a delay occurs until the data transferred from the BTS 21 arrives at the BTS 22 and even the MN 61 is in the soft handover state, the radio data sent from the BTS 22 may be merely taken as a multi-path interference noise. A delay occurs until the BTS 22 that receives the transferred data from the BTS 21 releases encapsulation and sends the data as radio data and even the MN 61 is in the soft handover state, the radio data sent from the BTS 22 may be merely taken as a multi-path interference noise.

BRIEF SUMMARY OF THE INVENTION

An object of the present invention is to provide a mobile communication system, a radio base station, an operation control method and a program that can perform handover without causing instantaneous interruption and packet loss and without lowering the performance of the entire network when the mobile communication system is realized by the IP network.

A mobile communication system according to the present invention is a mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, wherein the mobile node sends to a handover source radio base station address information of a link to which a handover destination radio base station is connected when the mobile node performs a handover, and each of the radio base stations has a measurement part measuring a data transfer time from the radio base station to the handover destination radio base station that is specified by the address information when it receives the address information from the mobile node, and each of the radio base stations transfers the IP packet data destined to the mobile node that is received from the IP network to the handover destination radio base station that is specified by the address information, while sending the data to the mobile node as radio data at a sending timing based on the data transfer time.

A radio base station according to the present invention is a radio base station in a mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, wherein the radio base station comprises means measuring a data transfer time from the radio base station to a handover destination radio base station that is specified by address information when receiving from the mobile node the address information of a link to which the handover destination radio base station is connected, and the radio base station transfers the IP packet data destined to the mobile node that is received from the IP network to the handover destination radio base station that is specified by the address information, while sending the data to the mobile node as radio data at a sending timing based on the data transfer time.

A method of controlling operation according to the present invention is a method of controlling operation of a radio base station in a mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, comprising:

measuring a data transfer time from the radio base station to a handover destination radio base station that is specified by address information when receiving from the mobile node the address information of a link to which the handover destination radio base station is connected, and transferring the IP packet data destined to the mobile node that is received from the IP network to the handover destination radio base station that is specified by the address information, while sending the data to the mobile node as radio data at a sending timing based on the data transfer time.

A program according to the present invention is a program for causing a computer to execute a method of controlling operation of a radio base station in a mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, comprising:

a process of measuring a data transfer time from the radio base station to a handover destination radio base station that is specified by address information when receiving from the mobile node the address information of a link to which the handover destination radio base station is connected, and a process of transferring the IP packet data destined to the mobile node that is received from the IP network to the handover destination radio base station that is specified by the address information, while sending the data to the mobile node as radio data at a sending timing based on the data transfer time.

A mobile communication system according to the present invention is a mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, wherein the mobile node sends to a handover source radio base station address information of a link to which a handover destination radio base station is connected when the mobile node performs a handover, and each of the radio base stations has means measuring a data transfer time from the radio base station to the handover destination radio base station that is specified by the address information when it receives the address information from the mobile node, and each of the radio base stations transfers the IP packet data destined to the mobile node that is received from the IP network to the handover destination radio base station that is specified by the address information, while sending the data to the mobile node as radio data at a sending timing based on the data transfer time.

As such, the present invention is adapted to send data from a handover source radio base station to a mobile node by sending to the handover source radio base station the address information of a link to which a handover destination radio base station is connected, when the mobile node performs the handover, and transfer the same data from the handover source radio base station to the handover destination radio base station. Therefore, the mobile node can receive the data both from the handover source radio base station and the handover destination radio station.

The handover source radio base station is adapted to measure a data transfer time from the handover source radio base station to the handover destination radio base station, and send the data same as that transferred to the handover destination radio base station to the mobile node at a sending timing based on the measured data transfer time. Therefore, it can reduce a sending timing difference between the handover source radio base station and the handover destination radio base station.

DETAILED DESCRIPTION OF THE PREFERRED EMBODIMENTS

Embodiments of the present invention will be described with reference to the drawings.

Figure 1:
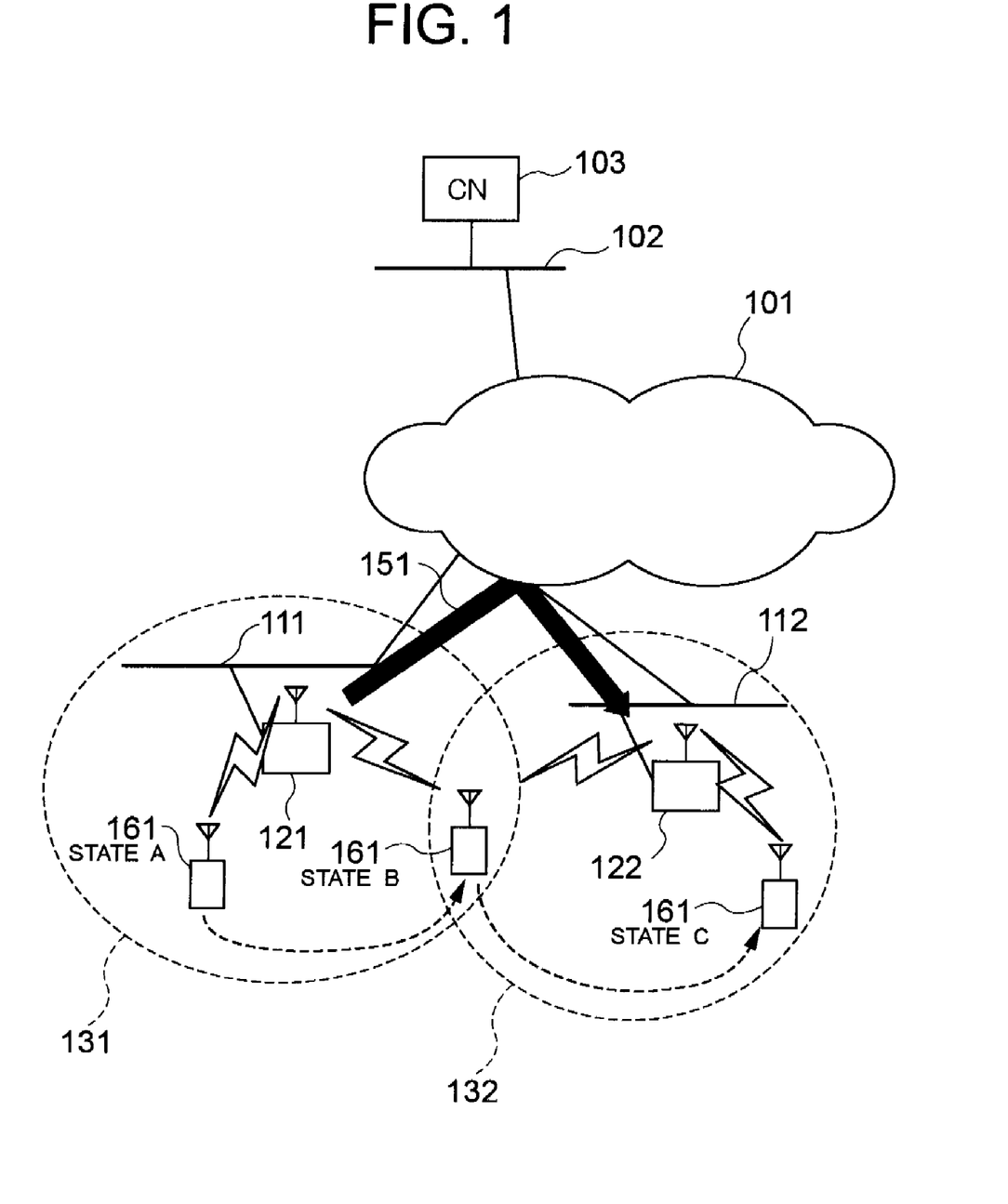
FIG. 1 is a diagram showing a configuration of a mobile communication system according to a first embodiment of the present invention.

FIG. 1 is a diagram showing a configuration of a mobile communication system according to a first embodiment of the present invention. As shown in FIG. 1, the mobile communication system according to the first embodiment of the present invention is connected with an IP network 101 using an IPv6, and includes a cell 131 and a cell 132. The IP network 101 is an IP network that is operating on the IPv6 and is well known to those skilled in the art. Therefore, it is omitted from the detailed description of the configuration.

A link 102 is an inherent network and is connected with the IP network 101 via a router or the like. A CN 103 is connected with the link 102. A link 111 is an inherent network and is connected with the IP network 101 via a router or the like. A BTS 121 is connected with the link 111. A link 112 is an inherent network and is connected with the IP network 101 via a router or the like. A BTS 122 is connected with the link 112. The CN 103 is connected with the link 102 and communicates with an MN 161 by a fixed IP address.

A cell 131 is formed by the BTS 121 that is connected with the IP network 101 via the link 111. The cell 131 is adjacent to a cell 132. The cell 132 is formed by the BTS 122 that is connected with the IP network 101 via the link 112. The cell 132 is adjacent to the cell 131.

Each of the BTSs 121 and 122 has a function of sending radio data received from the MN 161 to the IP network 101 as IP packet data and sending IP packet data received from the IP network 101 to the MN 161 as radio data. Each of the BTSs 121 and 122 has a function of periodically measuring a transfer time of data transferred from the BTS to a BTS specified by a CoA included in a Binding update message via the IP network 101 and a delay time inside the specified BTS (a time since the specified BTS received the transferred data until the specified BTS releases the encapsulation of the IP packet, which is the transferred data, and sends it as radio data) when each of the BTSs 121 and 122 has received the Binding update message from MN 161. Each of the BTSs 121 and 122 encapsulates the IP packet data destined to the MN 161, and transfers it to the BTS specified by the CoA included in the Binding update message. In addition, each of the BTSs 121 and 122 sends the IP packet data to the MN 101 as radio data after the measured transfer time and the delay time inside the specified BTS.

A measuring method of the transfer time and the delay time inside the specified BTS will be described below.

(1) A handover source BTS sends a delay time measuring message to a handover destination BTS (specified BTS) via the IP network 101. At that time, the handover source BTS stores the sent time of the message.

(2) The handover destination BTS receives the delay time measuring message, then sends a delay time measuring responding message including the delay time inside the handover destination BTS to the handover source BTS via the IP network 101.

(3) The handover source BTS which receives the delay time measuring responding message calculates (the received time−sent time)/2 as a transfer time, reads the delay time inside the handover destination BTS from the received delay time measuring responding message, and obtains the transfer time and the delay time inside the handover destination BTS.

The method for measuring the transfer time and the delay time is not limited to that described above and those to be described below may be adopted.

(1) It is assumed that a plurality of BTS are synchronized with GPS (Global Positioning System) and the plurality of BTS share a common time. As the GPS is well-known to those skilled in the art, and it is not directly related with the present invention, it is omitted from a detailed description.

(2) The handover source BTS sends a delay time measuring message including the sent time of the message to the handover destination BTS via the IP network 101.

(3) The handover destination BTS receives the delay time measuring message, and sends a delay time measuring responding message including the received time and the delay time inside the handover destination BTS to the handover source BTS via the IP network 101.

(4) The handover source BTS receives the delay time measuring responding message, then calculates (the received time−the sent time) as the transfer time, reads the delay time inside the handover destination BTS from the received delay time measuring responding message, and obtains the transfer time and the delay time inside the handover destination BTS.

Each of the BTSs 121 and 122 has a function of releasing the encapsulation of the IP packet when it receives the transferred data from another BTS, and sending the data to the MN 161 as radio data.

The MN 161 has a function of sending and receiving radio data to and from a BTS, and connects to the IP network via the BTS and communicates with the CN 103 by using the fixed IP address.

When the MN 161 moves near to the boundary with an adjacent cell in the cell in which the MN 161 is present, it tries to perform handover to a BTS that forms the adjacent cell. When the MN 161 performs the handover, it obtains the CoA of the link connected with the BTS that forms the adjacent cell, and sends a Binding update message including the obtained CoA to the handover source BTS. After sending the Binding update message, the MN 161 enters in soft handover state as it receives data from both the handover source BTS and the adjacent BTS (handover destination BTS). In the soft handover state, the MN 161 does not send a Binding update message to the CN 103. When the handover of the MN 161 completed, the MN 161 sends a Binding update message including the CoA to the CN 103 via the link to which the adjacent BTS is connected.

The CN 103 is connected with the link 102 and communicates with the MN 161 by a fixed IP address. When the CN 103 receives the Binding update message from the MN 161, it selects a path for sending data to the MN 161 via the handover destination BTS by performing routing based on the CoA included in the Binding update message. That routing function is a standard function of the IPv6, thus, it will be omitted from the description here.

Figure 2:
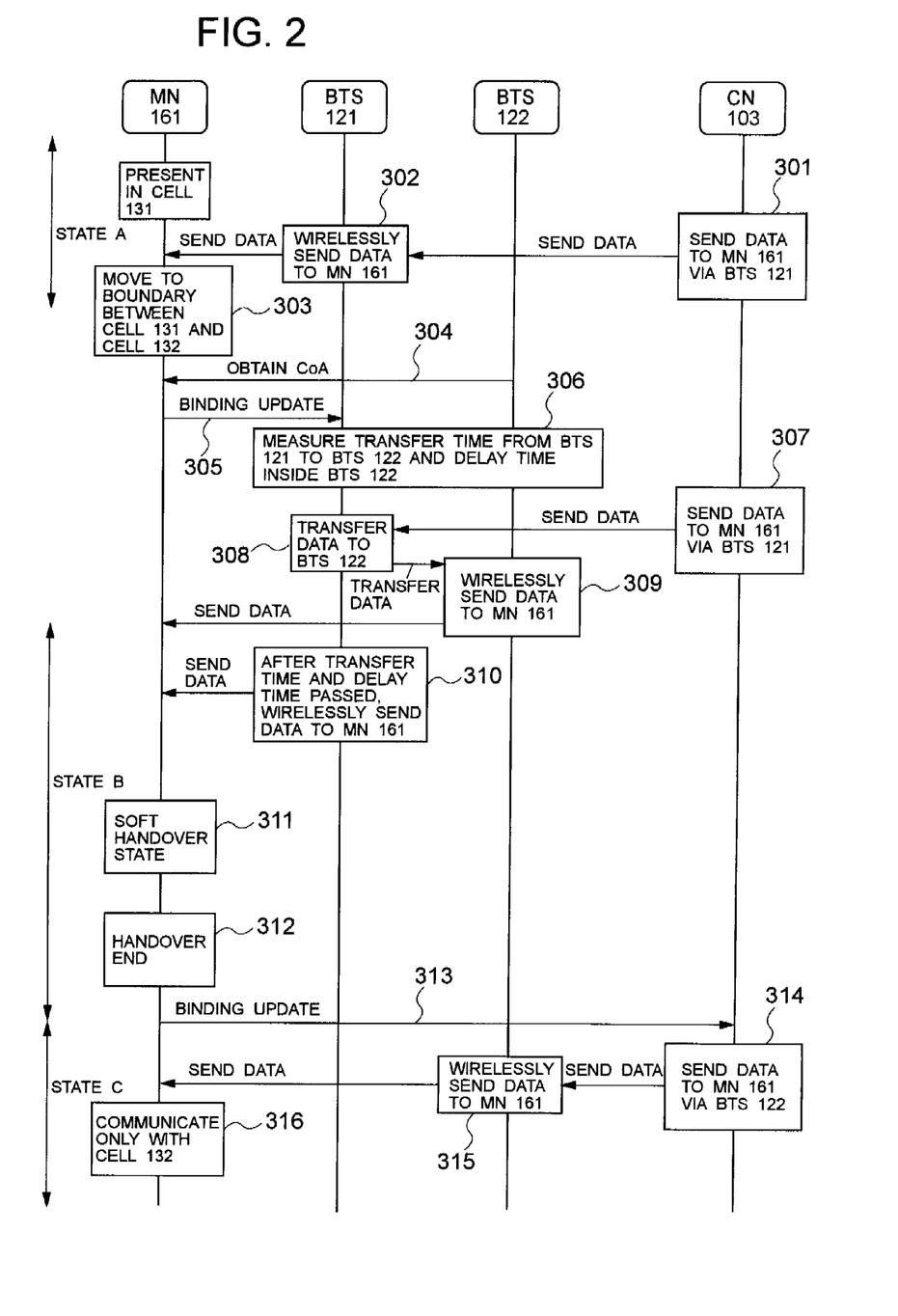
FIG. 2 is a sequence diagram showing operations of the mobile communication system according to the first embodiment of the present invention.

Now, a handover method in the mobile communication system according to the first embodiment of the present invention shown in FIG. 1 will be described with reference to FIGS. 1 and 2. FIG. 2 is a sequence diagram showing operations of the mobile communication system according to the first embodiment of the present invention. With reference to FIG. 2, the procedure for the MN 161 to perform handover from the cell 131 to the cell 132 will be described.

(1) The MN 161 is in the handover source cell 131 and performs IP communication with the CN 103 via the BTS 121 (step 301). The BTS 121 converts received radio data to IP packet data, and converts received IP packet data to radio data (step 302). The CN 103 routes the IP packet to send by the link 111 to which the BTS 121 belongs. (It is shown as a state A in FIGS. 1 and 2)

(2) When the MN 161 moves to the boundary of the cell 132 (step 303), the handover to the cell 112 is performed in the procedure below.

(3) The MN 161 obtains the CoA of the link 112, to which the cell 132 is connected, via the BTS 122 (step 304).

(4) The MN 161 sends the Binding update message including the obtained CoA to the BTS 121 (step 305)

(5) The BTS 121 receives the Binding update message from the MN 161 and measures the transfer time between the BTS 121 and the BTS 122 and the delay time inside the BTS 122 (step 306). Here, it is assumed that the transfer time and the delay time are periodically measured during the handover of the MN 161.

(6) When the BTS 121 receives the IP packet destined to the MN 161, it encapsulates the IP packet destined to the MN 161, and transfers the data to the BTS 122 specified by the CoA included in the Binding update message via the IP network 101 as shown by the path 151 (step 308), and, after the measured transfer time and the delay time inside the BTS 122, it sends the data to the MN 161 by wireless (step 310).

(7) The BTS 122 receives the transferred data from the BTS 121, releases the encapsulation, and sends the transferred data to the MN 161 by wireless (step 309).

(8) As the MN 161 can receive the same data from the BTS 121 and the BTS 122, it enters in the soft handover state (step 311). (It is shown as a state B in FIGS. 1 and 2)

(9) When the handover completed (step 312), the MN 161 sends the Binding update message including the obtained CoA to the CN 103 via the BTS 122 and the link 112 (step 313).

(10) The CN 103 receives the Binding update message from the MN 161, and switches routing of the IP packet to be sent to the MN 161 from the link 111, to which the BTS 121 belongs, to the link 112, to which the BTS 122 belongs (step 314).

(11) Accordingly, the MN 161 is to receive the data only from the BTS 122 (step 316) and the handover completed. (It is shown as a state C in FIGS. 1 and 2)

In the first embodiment of the present invention, as the MN 161 receives data from both the handover source BTS 121 and the handover destination BTS 122 and enters in the soft handover state, it can perform the handover without causing instantaneous interruption of the communication or packet loss. Then, the MN 161 can receives electric waves from a plurality of BTS and perform rake combining under the circumstances of the received power weakened such at the cell boundary, which may improve the communication quality.

During the handover, the transferred data is transferred from the handover source BTS 121 to the handover destination BTS 122. Adjacent BTS are highly possible to be arranged to have a little metric even on the IP network. Thus, if data is transferred during handover, they have a little delay and a load on the network just locally increases. That eliminates any possibility of degrading the performance of the entire network.

As the Binding update message is sent from the MN 161 to the CN 103 at the completion of the handover, the CN 103 uses a path through the handover destination BTS 122. Thus, sending of radio data from the handover source BTS 121 finishes, so that unnecessary interference can be reduced.

If the metric between the link 111 and the link 112 is big, a delay occurs until the data transferred from the BTS 121 arrives at the BTS 122. Thus, even if the MN 161 is in the soft handover state (state B), the radio data sent from the BTS 122 may be just taken as a multi-path interference noise. Even if the MN 161 is in the soft handover state (state B), the radio data sent from the BTS 122 may be just taken as a multi-path interference noise due to a delay since the BTS 122 receives the transferred data from the BTS 121 until it releases the encapsulation and sends the data as the radio data.

The CDMA mobile communication system can effectively use the multi-path interference noise by using rake receiving, though, the delay time is limited. If the delay time exceeds a limit, the multi-path interference noise prevents the radio resources from being effectively used. Although Japanese Patent Laid-Open No. 2005-110014 describes that the OFDMA mobile communication system prevents the above conditions so as to increase guard interval only during the handover and lowering the interference between symbols, the system increases the guard interval by lowering the communication rate. That also prevents the radio resources from being effectively used.

In the first embodiment of the present invention, however, a delay on the IP network between the handover source BTS 121 and the handover destination BTS 122 is recognized at step 306 in FIG. 2 and the BTS 121 sends the data to the MN 161 at the sending timing based on the delay time. That can reduce a sending timing error from a plurality of BTS and minimize an arrival delay time of the radio data from the handover source BTS 121 and the radio data from the handover destination BTS 122 that are received by the MN 161. That enables rake combining in a CDMA communication method and improves the quality of communication so that reducing the transmit power from the BTS by the transmit power control to reduce the interference. As an OFDMA communication method can reduce the interference between symbols by reducing the sending timing error, the guard interval can be set low. As a result, the radio resources can be effectively used both in the CDMA communication method and the OFDMA communication method.

A second embodiment of the present invention will be described with reference to the drawings. The mobile communication system according to the second embodiment of the present invention has the same configuration as that of the mobile communication system according to the first embodiment shown in FIG. 1 except for operations of the BTS 121 and 122 during the handover.

Figure 3:
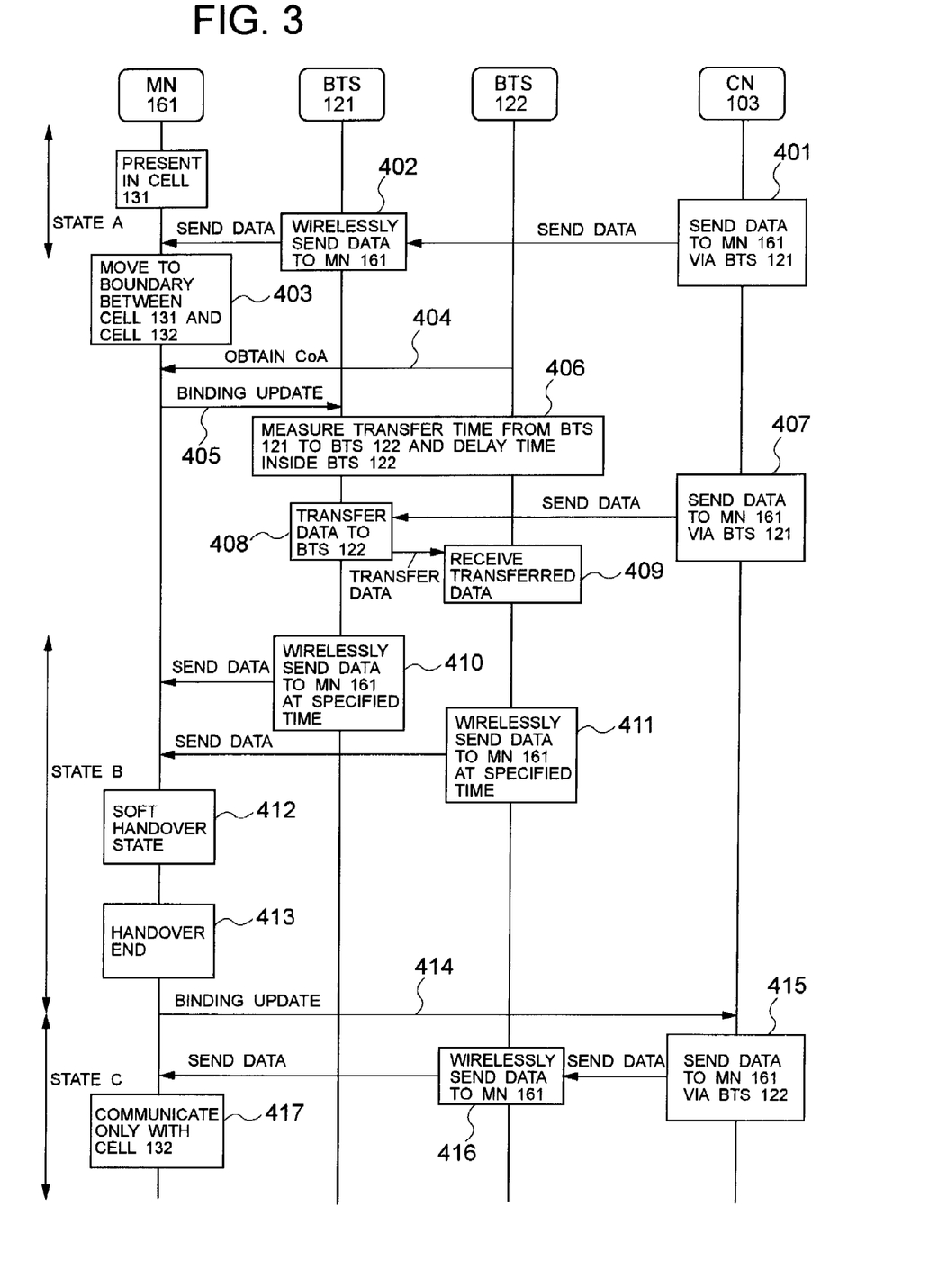
FIG. 3 is a sequence diagram showing operations of a mobile communication system according to a second embodiment of the present invention.

A handover method in the mobile communication system according to the second embodiment of the present invention will be described with reference to FIGS. 1 and 3. FIG. 3 is a sequence diagram showing operations of the mobile communication system according to the second embodiment of the present invention. With reference to FIG. 3, the procedure for the MN 161 performs handover from the cell 131 to the cell 132 will be described. As steps 401 to 407 and steps 412 to 417 in FIG. 3 are the same as steps 301 to 307 and steps 311 to 316 in FIG. 2, the description of steps 401 to 407 and steps 412 to 417 will be omitted from the description.

When the BTS 121 receives the IP packet destined to the MN 161, it calculates the sending timing in consideration of the transfer time and the delay time inside the BTS 122 measured at step 406, encapsulates the IP packet data destined to the MN 161, gives the sending timing to the data, and performs the data transfer 151 to the BTS 122 specified by the CoA included in the Binding update message via the IP network 101 (step 408). Then, the BTS 121 sends the IP packet to the MN 161 at the sending timing as radio data (step 410).

The BTS 122 receives the transferred data from the BTS 121, releases the encapsulation (step 409), and sends the transferred data to the MN 161 at the sending timing included in the transferred data as radio data (step 411).

As such, the second embodiment of the present invention is adapted to make both of the handover source BTS 121 and the handover destination BTS 122 send the same radio data to the MN 161 at the sending start time of the radio data by causing the handover source BTS 121 to control the sending start time based on the measured transfer time and the delay time inside the BTS 122 and give information of the sending start time to the transferred data. Thus, the arrival delay time of the radio data from the handover source BTS 121 and the radio data from the handover destination BTS 122 which are received by the MN 161 can be minimized.

The processing operations of each of the BTSs 121 and 122 performed in accordance with each of the sequence charts shown in FIGS. 2 and 3 can be realized by causing a computer including a CPU (controlling part) to read and execute a program previously stored in a storage medium such as a ROM in the BTS.

What is claimed is:

1. A mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, wherein the mobile node sends to a handover source radio base station address information of a link to which a handover destination radio base station is connected when the mobile node performs a handover, and each of the radio base stations has a measurement part measuring a data transfer time from the radio base station to the handover destination radio base station that is specified by the address information when it receives the address information from the mobile node, and each of the radio base stations transfers the IP packet data destined to the mobile node that is received from the IP network to the handover destination radio base station that is specified by the address information, while sending the data to the mobile node as radio data at a sending timing based on the data transfer time.

2. The mobile communication system according to claim 1, wherein each of the radio base stations sends the sending timing based on the data transfer time to the handover destination base station that is specified by the address information so that the transferred data is sent to the mobile node at the sending timing.

3. The mobile communication system according to claim 1, wherein the measurement part measures the data transfer time by sending a measurement message to the handover destination radio base station that is specified by the address information and receiving a responding message from the handover destination radio base station that is specified by the address information.

4. The mobile communication system according to claim 3, wherein the responding message includes information on a delay time in the handover destination radio base station that is specified by the address information, and the data transfer time includes the delay time.

5. The mobile communication system according to claim 1, wherein the address information is CoA (Care of Address) information.

6. A radio base station in a mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, wherein the radio base station comprises means measuring a data transfer time from the radio base station to a handover destination radio base station that is specified by address information when receiving from the mobile node the address information of a link to which the handover destination radio base station is connected, and the radio base station transfers the IP packet data destined to the mobile node that is received from the IP network to the handover destination radio base station that is specified by the address information, while sending the data to the mobile node as radio data at a sending timing based on the data transfer time.

7. The radio base station according to claim 6, wherein the radio base station sends the sending timing based on the data transfer time to the handover destination base station that is specified by the address information so that the transferred data is sent to the mobile node at the sending timing.

8. The radio base station according to claim 6, wherein the means measures the data transfer time by sending a measurement message to the handover destination radio base station that is specified by the address information and receiving a responding message from the handover destination radio base station that is specified by the address information.

9. The radio base station according to claim 8, wherein the responding message includes information on a delay time in the handover destination radio base station that is specified by the address information, and the data transfer time includes the delay time.

10. The radio base station according to claim 6, wherein the address information is CoA (Care of Address) information.

11. A method of controlling operation of a radio base station in a mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, comprising:

measuring a data transfer time from the radio base station to a handover destination radio base station that is specified by address information when receiving from the mobile node the address information of a link to which the handover destination radio base station is connected, and transferring the IP packet data destined to the mobile node that is received from the IP network to the handover destination radio base station that is specified by the address information, while sending the data to the mobile node as radio data at a sending timing based on the data transfer time.

12. The method of controlling operation according to claim 11, wherein the radio base station sends the sending timing based on the data transfer time to the handover destination radio base station that is specified by the address information so that the transferred data is sent to the mobile node at the sending timing.

13. The method of controlling operation according to claim 11, wherein the radio base station measures the data transfer time by sending a measurement message to the handover destination radio base station that is specified by the address information and receiving a responding message from the handover destination radio base station that is specified by the address information.

14. The method of controlling operation according to claim 13, wherein the responding message includes information on a delay time in the handover destination radio base station that is specified by the address information, and the data transfer time includes the delay time.

15. The method of controlling operation according to claim 11, wherein the address information is CoA (Care of Address) information.

16. A program for causing a computer to execute a method of controlling operation of a radio base station in a mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, comprising:

a process of measuring a data transfer time from the radio base station to a handover destination radio base station that is specified by address information when receiving from the mobile node the address information of a link to which the handover destination radio base station is connected, and a process of transferring the IP packet data destined to the mobile node that is received from the IP network to the handover destination radio base station that is specified by the address information, while sending the data to the mobile node as radio data at a sending timing based on the data transfer time.

17. A mobile communication system comprising a plurality of radio base stations each of which has a function of sending received radio data to the IP network as IP packet data and sending IP packet data received from the IP network as radio data and a mobile node with a function of sending and receiving radio data to and from the radio base station for communicating with a correspondent node by connecting with the IP network via the radio base station, wherein the mobile node sends to a handover source radio base station address information of a link to which a handover destination radio base station is connected when the mobile node performs a handover, and each of the radio base stations has means measuring a data transfer time from the radio base station to the handover destination radio base station that is specified by the address information when it receives the address information from the mobile node, and each of the radio base stations transfers the IP packet data destined to the mobile node that is received from the IP network to the handover destination radio base station that is specified by the address information, while sending the data to the mobile node as radio data at a sending timing based on the data transfer time.

* * * * *